United States Patent
Christensson et al.

(10) Patent No.: US 10,211,888 B2
(45) Date of Patent: Feb. 19, 2019

(54) NETWORK NODE AND A METHOD THEREIN FOR PERFORMING COMP RECEPTION OF A TRANSMISSION FROM A WIRELESS DEVICE

(71) Applicant: Telefonaktiebolaget LM Ericsson (publ), Stockholm (SE)

(72) Inventors: Anders Christensson, Älvsjö (SE); Christian Skärby, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 114 days.

(21) Appl. No.: 15/308,120

(22) PCT Filed: Jul. 9, 2014

(86) PCT No.: PCT/SE2014/050879
§ 371 (c)(1),
(2) Date: Nov. 1, 2016

(87) PCT Pub. No.: WO2016/007055
PCT Pub. Date: Jan. 14, 2016

(65) Prior Publication Data
US 2017/0063435 A1    Mar. 2, 2017

(51) Int. Cl.
*H04B 7/024* (2017.01)
*H04B 7/155* (2006.01)
(Continued)

(52) U.S. Cl.
CPC .......... *H04B 7/024* (2013.01); *H04L 5/006* (2013.01); *H04L 43/0882* (2013.01);
(Continued)

(58) Field of Classification Search
CPC .............. H04B 7/024; H04W 28/0289; H04W 28/0236; H04W 92/20; H04W 72/00; H04L 43/16; H04L 5/006; H04L 43/0882
See application file for complete search history.

(56) References Cited

U.S. PATENT DOCUMENTS

2012/0120867 A1*  5/2012  Horiuchi ................ H04B 7/155
                                                                  370/315

FOREIGN PATENT DOCUMENTS

CA          2673889 A1      7/2008
EP          2538603 A1     12/2012
(Continued)

OTHER PUBLICATIONS

Diehm, F., et al., "On the Impact of Signaling Delays on the Performance of Centralized Scheduling for Joint Detection Cooperative Cellular Systems", IEEE Wireless Communications and Networking Conference (WCNC), Mar. 28, 2011, pp. 1897-1902, IEEE.

(Continued)

*Primary Examiner* — Kiet Tang
(74) *Attorney, Agent, or Firm* — Coats & Bennett, PLLC (57) ABSTRACT

A network node and a method therein for CoMP reception of a transmission from a wireless device are provided. The method comprises determining (110) an available backhaul capacity of a reception point of the serving RBS and of at least one potential reception point of respective further RBS(s); and determining (120) a received signal quality of a received signal, transmitted from the wireless device, received by the reception point of the serving RBS and received by the at least one potential reception point of the respective further RBS(s). The method comprises determining (130) cooperating reception of the transmission from the wireless device and determining a TBS for the transmission from the wireless device based on the determined available (Continued)

backhaul capacity and received signal quality; and notifying (140) the respective RBS(s) of the determined cooperation reception point(s) about their participation in the CoMP reception.

21 Claims, 6 Drawing Sheets

(51) Int. Cl.
*H04L 5/00* (2006.01)
*H04L 12/26* (2006.01)
*H04W 28/02* (2009.01)
*H04W 72/00* (2009.01)
*H04W 92/20* (2009.01)

(52) U.S. Cl.
CPC ......... *H04L 43/16* (2013.01); *H04W 28/0236* (2013.01); *H04W 28/0289* (2013.01); *H04W 72/00* (2013.01); *H04W 92/20* (2013.01)

(56) References Cited

FOREIGN PATENT DOCUMENTS

| RU | 2420878 C2 | 2/2011 |
| WO | 2004102863 A1 | 11/2004 |
| WO | 2011093756 A1 | 8/2011 |

OTHER PUBLICATIONS

Choi, C., et al., "Coordinated Multipoint Multiuser-MIMO Transmissions over Backhaul-Constrained Mobile Access Networks", 2011 IEEE 22nd International Symposium on Personal Indoor and Mobile Radio Communications (PIMRC), Sep. 11, 2011, pp. 1336-1340, IEEE.

* cited by examiner

NETWORK NODE AND A METHOD THEREIN FOR PERFORMING COMP RECEPTION OF A TRANSMISSION FROM A WIRELESS DEVICE

TECHNICAL FIELD

The present disclosure relates to wireless communication and in particular to a network node and a method performed by the network node for performing Coordinated Multi Point, CoMP, reception of a transmission from a wireless device being served by a serving Radio Base Station, RBS.

BACKGROUND

A wireless communication system or network covers a geographical area which is divided into radio coverage areas, e.g. referred to as radio cells or sectors. Each radio coverage area is served by an RBS, sometimes referred to as a NodeB or eNodeB, eNB. A reception point is referred to as a set of co-located antennas that provide coverage to one radio coverage area. One RBS may serve one or several radio coverage areas.

Uplink Coordinated Multi Point, CoMP, is a multi-antenna technique that commonly refers to utilising received signals from more than one such reception point, when performing reception of a transmission from a wireless device. This may be compared to the normal case, where only one reception point, i.e. the serving reception point, is used when performing reception for the wireless device.

Signal processing of multi point signal reception becomes quite easy if all reception points are connected to the same RBS since no additional transport of CoMP data is required between RBSs. But sometimes the most favourable cooperation reception point candidates for a particular wireless device are not co-located within the same RBS. When uplink CoMP, hereinafter also referred to as CoMP reception, between reception points that belong to different RBSs is used, the transmission that has been received from cooperating reception points of respective RBSs must be transmitted to the serving RBS.

The usage of multiple antennas, either for transmission or for reception, has a high potential of improving the system performance in terms of capacity, throughput and robustness. For instance, the multiple antennas may be used to transmit/receive different copies of the same information thus increasing diversity and robustness. Alternatively, these antennas can be used to transmit/receive different information through spatial multiplexing. The transmitting and/or receiving antennas can be co-located or distributed, and can even belong to different reception points or RBSs.

Uplink CoMP is a multi-antenna technique where a wireless device's transmitted signal is received and combined using the received signal not only at the antennas of the serving reception point, but also at the antennas of neighbouring, or cooperating, reception points. The selection of which neighbouring (cooperating) reception points to use may be based on e.g. how much power these reception points receive from the wireless device's transmission.

One challenge when using uplink CoMP is that sometimes the most beneficial cooperating reception points are not located within the same RBS. This means that the serving RBS has to request CoMP data from a neighbouring reception point that belongs to a different RBS. An X2 connection between cooperating RBSs might exist but usually over a backhaul with limited capacity or bandwidth. A simple solution is to cater for higher capacity on the X2 interface in order to also be able to send CoMP data between the RBSs. Both X2 and S1 are logical interfaces, i.e. they do not need to be connected directly, e.g. by means of a physical cable. They generally run over Internet Protocol, IP. Even though X2 is an interface for "direct connection" from one RBS to another RBS, in real case, the traffic may be transported along the same backhaul as S1 related traffic. This solution might however be quite expensive or even impossible due to existing infrastructure. Example of other limitations that may exist are too high latency over the backhaul, the serving RBS's capacity to process incoming CoMP data or the cooperating RBSs' capacity to send CoMP data to the serving RBS.

All these limitations add up to a compiled backhaul capacity limitation that is changing rapidly, even from Transmission Time interval, TTI, to TTI. By using this limitation as an input when determining the cooperation candidates, one can decide if the cooperation will succeed or not. However, using this evaluation criterion for selection cooperation candidates, one might end up excluding candidates that could have been beneficial to cooperate with.

SUMMARY

The object is to obviate at least some of the problems outlined above. In particular, it is an object to provide a network node and a method performed by the network node for performing CoMP reception of a transmission from a wireless device being served by a serving RBS. These objects and others may be obtained by providing a network node and a method in a network node according to the independent claims attached below.

According to an aspect a method performed by a network node for performing CoMP reception of a transmission from a wireless device being served by a serving RBS is provided. The method comprises determining an available backhaul capacity of a reception point of the serving RBS and of at least one potential reception point of respective further RBS(s); and determining a received signal quality of a received signal, transmitted from the wireless device, received by the reception point of the serving RBS and received by the at least one potential reception point of the respective further RBS(s). The method further comprises determining cooperating reception point(s), from amongst the at least one potential reception point of the respective further RBS(s), to be included in the CoMP reception of the transmission from the wireless device and determining a Transport Block Size, TBS, for the transmission from the wireless device based on the determined available backhaul capacity and received signal quality; and notifying the respective RBS(s) of the determined cooperation reception point(s) about their participation in the CoMP reception.

According to an aspect, a network node adapted for performing CoMP reception of a transmission from a wireless device being served by a serving RBS is provided. The network node is configured to determine an available backhaul capacity of a reception point of the serving RBS and of at least one potential reception point of respective further RBS(s); and to determine a received signal quality of a received signal, transmitted from the wireless device, received by the reception point of the serving RBS and received by the at least one potential reception point of the respective further RBS(s). The network node further is configured to determine cooperating reception point(s), from amongst the at least one potential reception point of the respective further RBS(s), to be included in the CoMP reception of the transmission from the wireless device and determining a TBS for the transmission from the wireless device based on the determined available backhaul capacity and received signal quality; and to notify the respective RBS(s) of the determined cooperation reception point(s) about their participation in the CoMP reception.

The method performed by the network node and the network node may have several possible advantages. One possible advantage is that the available radio and transport resources may be efficiently utilised to maximise overall system performance. Another possible advantage is that possible overload of the interfaces, e.g. the backhaul, may be avoided and thus potential disruption of other more important traffic may be avoided. Still a possible advantage is that it may ensure that cooperation requests may be successful thus endorsing expected performance improvement. Yet a possible advantage is that data may not be lost due to congestion since the CoMP reception may not be performed in case the backhaul is congested.

BRIEF DESCRIPTION OF DRAWINGS

Embodiments will now be described in more detail in relation to the accompanying drawings, in which.

DETAILED DESCRIPTION

Briefly described, a network node and a method performed by the network node for performing CoMP reception of a transmission from a wireless device being served by a serving RBS are provided. The network node obtains information relating to a current available backhaul capacity and received signal quality of a reception point of a serving RBS and of at least one potential cooperating reception points of respective RBS(s). Then, based on both the current available backhaul capacity and the respective received signal quality of the serving and potential cooperating reception points, the network node determines which reception points are to be included in the CoMP reception and a TBS for the transmission from the wireless device.

Since the backhaul also carries a variety of different S1 or X2 traffic, the CoMP reception scheme will have to share the backhaul with such traffic. The RBS may use the S1 application protocol on the S1-MME (Mobility Management Entity) interface with the Mobility Management Entity (MME) for control plane traffic.

Embodiments of a method performed by a network node in a wireless communication network for performing CoMP reception of a transmission from a wireless device being served by a RBS will now be described with reference to FIGS. 1a-1e.

Figure 1A:
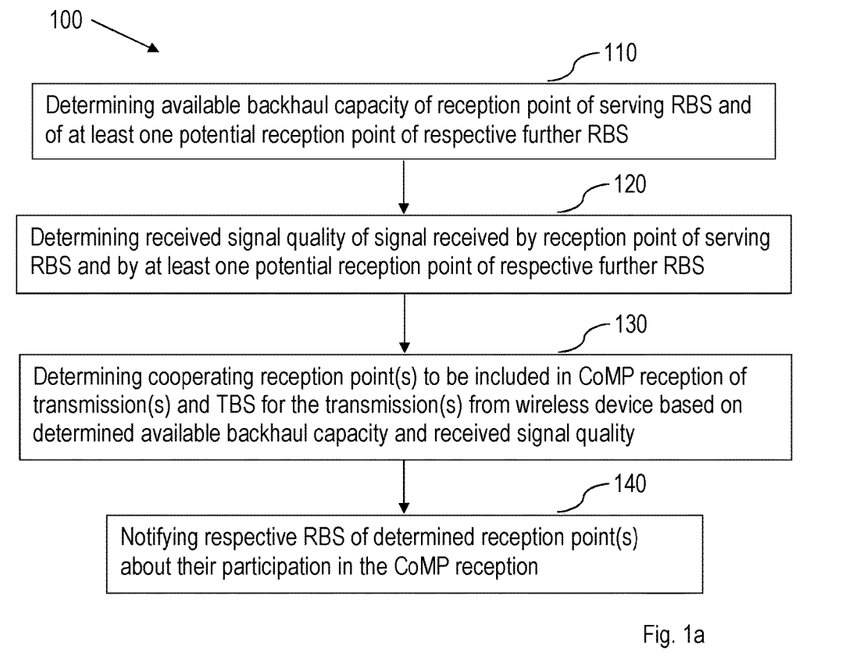
FIG. 1a is a flowchart of a method performed by a network node for performing CoMP reception of a transmission from a wireless device being served by a serving RBS according to an exemplifying embodiment.

FIG. 1a illustrates the method 100 comprising determining 110 an available backhaul capacity of a reception point of the serving RBS and of at least one potential reception point of respective further RBS(s); and determining 120 a received signal quality of a received signal, transmitted from the wireless device, received by the reception point of the serving RBS and received by the at least one potential reception point of the respective further RBS(s). The method further comprises determining 130 cooperating reception point(s), from amongst the at least one potential reception point of the respective further RBS(s), to be included in the CoMP reception of the transmission from the wireless device and determining a Transport Block Size, TBS, for the transmission from the wireless device based on the determined available backhaul capacity and received signal quality; and notifying 140 the respective RBS(s) of the determined cooperation reception point(s) about their participation in the CoMP reception.

The network node is responsible for making the decision about whether or not to perform the CoMP reception of the transmission from the wireless device or not. The network node may be the serving RBS or a Radio Network Controller, RNC, controlling the serving RBS.

In order to decide to perform the CoMP reception, the network node should have some information to base the decision on. Consequently, the network node determines the available backhaul capacity for the serving RBS of the reception point. Since the CoMP requires at least two reception points to receive the transmission from the wireless device, and since the at least two reception point may be comprised in, or coupled to, different RBSs, the RBSs need to be able to communicate. For example, an RBS of a cooperating reception point should be able to forward the received transmission to the reception point of the serving RBS. This is done on the backhaul, consequently there should be enough available capacity on the backhaul to do so. The available backhaul capacity may be determined by measuring a usage level of the backhaul load situation, however, the way to determine the available backhaul capacity is out of the scope of this disclosure.

The network node also determines the received signal quality of a received signal, transmitted from the wireless device, received by the reception point of the serving RBS and received by the at least one potential reception point of the respective further RBS(s). The received signal is not the upcoming transmission from the wireless device for which the CoMP reception potentially is to be performed, but another signal, which may be a data transmission or a reference signal, transmitted from the wireless device and received by at least two reception points. In order for the CoMP reception to be efficient, the cooperating reception points should have at least a relatively good received signal quality. Further, if the received signal quality of the serving RBS is good or excellent, there may be little gain, with respect to signal quality, to engage in CoMP, however there may be other reasons for still engaging in CoMP reception as will be explained in more detail below. Thus, the received signal quality of the reception point of the serving RBS and the received signal quality of potential reception point(s) of the respective further RBS(s) are determined.

Based on the available backhaul capacity and the received signal quality of the reception point of the serving RBS and the received signal quality of potential reception point(s) of the respective further RBS(s), the network node determines cooperating reception point(s), from amongst the at least one potential reception point of the respective further RBS(s), to be included in the CoMP reception of the transmission from the wireless device. Also based on the same information, the network node determines the TBS for the transmission from the wireless device. For LTE, the TBS may be calculated based on e.g. the Modulation and Coding Scheme, MCS, the number of allocated Physical Resource Blocks, PRBs and the number of available Resource Elements, REs, depending on e.g. how many REs are reserved for the Physical Downlink Control Channel, PDCCH, Reference Symbols, RS, etc.

Once the network node has determined which reception points (and thus also which RBSs) will take part in the CoMP reception, the network node notifies the respective RBS(s) of the determined cooperation reception point(s) about their participation in the CoMP reception. This is done in order for the respective RBS(s) to forward the received transmission to the serving RBS so that the RBS may process the transmission from the wireless device using its own version of the received transmission and the respective version(s) of the cooperating reception point(s).

The method performed by the network node may have several possible advantages. One possible advantage is that the available radio and transport resources may be efficiently utilised to maximise overall system performance. Another possible advantage is that possible overload of the interfaces, e.g. the backhaul, may be avoided and thus potential disruption of other more important traffic may be avoided. Still a possible advantage is that it may ensure that cooperation requests may be successful thus endorsing expected performance improvement. Yet a possible advantage is that data may not be lost due to congestion since the CoMP reception may not be performed in case the backhaul is congested.

Figure 1B:
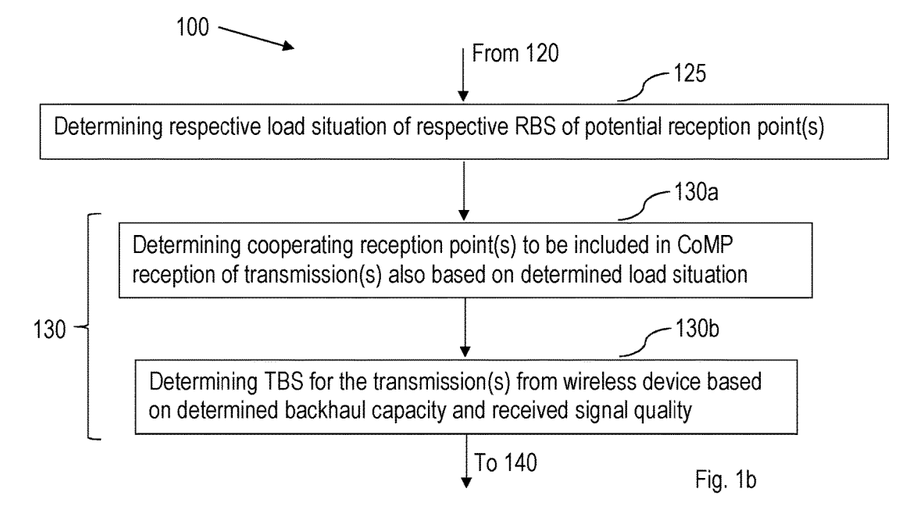
FIG. 1b is a flowchart of a method performed by a network node for performing CoMP reception of a transmission from a wireless device being served by a serving RBS according to yet an exemplifying embodiment.

The method 100 may further comprise, as illustrated in FIG. 1b, determining 125 a respective load situation of the respective RBS of the potential reception point(s), wherein determining 130, 130a cooperating reception point(s) to be included in the CoMP reception of transmissions from the wireless device further is based on the determined load situation of the respective RBS(s) of the potential reception point(s).

In addition to determining the available backhaul capacity and the received signal quality of the reception point of the serving RBS and the received signal quality of potential reception point(s) belonging to the respective further RBS(s), the network node determines the load situation of the respective RBS(s) of the potential reception point(s). In case an RBS of a potential reception point is experiencing a relatively high load, it may put unnecessary strain on that RBS to include it in the CoMP reception even if the received signal quality of that reception point is relatively good. Thus, the network node may decide not to include that reception point in the CoMP reception in order to spare the RBS the extra burden of forwarding the received transmission to the serving RBS.

The load of the respective RBS(s) of the potential reception point(s) may be determined in different ways, e.g. the network node may receive a report of the respective RBS(s) indicating their individual load.

Figure 1C:
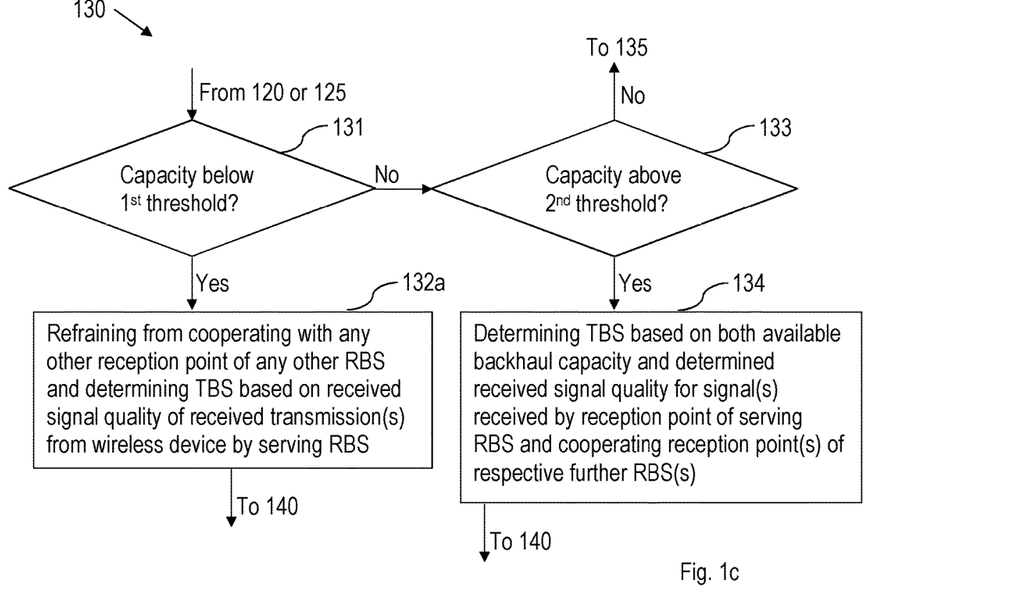
FIG. 1c is a flowchart of a method performed by a network node for performing CoMP reception of a transmission from a wireless device being served by a serving RBS according to still an exemplifying embodiment.
Figure 1D:
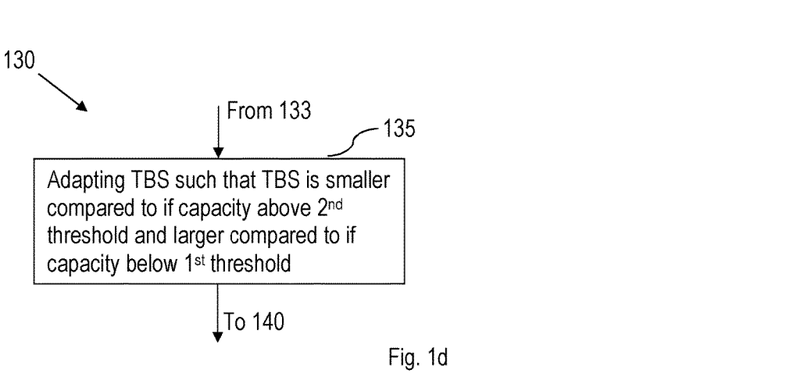
FIG. 1d is a flowchart of a method performed by a network node for performing CoMP reception of a transmission from a wireless device being served by a serving RBS according to another exemplifying embodiment.
Figure 1E:
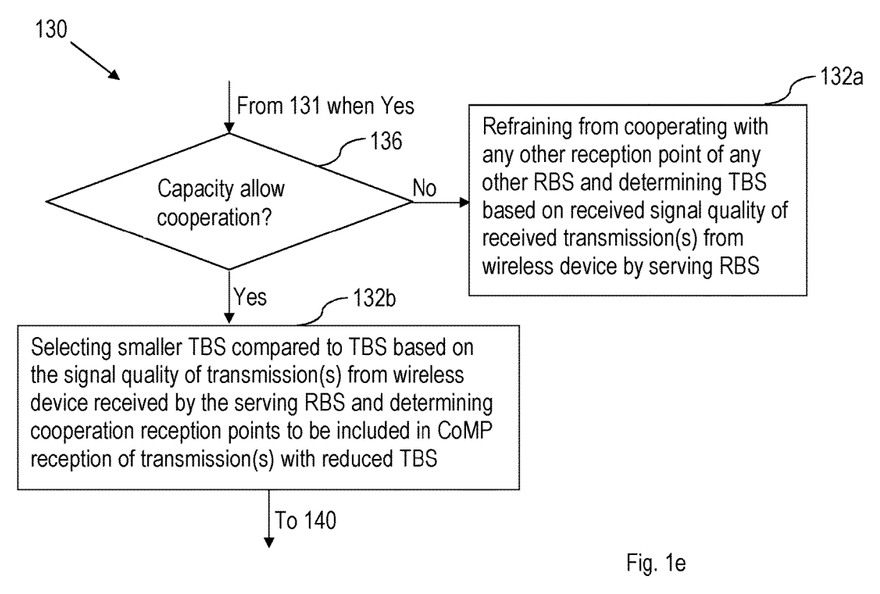
FIG. 1e is a flowchart of a method performed by a network node for performing CoMP reception of a transmission from a wireless device being served by a serving RBS according to a further exemplifying embodiment.

In an example, illustrated in FIG. 1c, when the available backhaul capacity is below a first threshold, the method comprises refraining 132a from cooperating with any other reception point of any other respective RBS, from amongst the at least one potential reception point of the respective further RBS(s), and determining the TBS based on the signal quality of received transmission(s) from the wireless device received by the serving RBS.

When the available backhaul capacity is below the first threshold, it serves as an indication to the network node that there is limited or little available capacity on the backhaul. Thus, in this example, the network node determines to refrain from cooperating with any other reception point of any other respective RBS in order to not incur further load on the backhaul.

Since there will be no other cooperating reception points of any other RBSs, the network node determines the TBS based on the signal quality of received transmission(s) from the wireless device received by the serving RBS.

In another example, when the available backhaul capacity is above a second threshold, the method comprises determining 134 the TBS based on both the available backhaul capacity and the determined signal quality for signals received by the reception point of the serving RBS and the cooperating reception point(s) of the respective further RBS(s).

In this example, the available backhaul capacity is high, meaning that there is little or no restriction with regards to CoMP reception. Comparing with the first threshold described above, the second threshold is assumed to be higher than the first threshold. The network node need take limited consideration, or even no consideration, to the available backhaul capacity. Instead the network node may determine which cooperating reception point(s), from amongst the at least one potential reception point of the respective further RBS(s), to be included in the CoMP reception of the transmission from the wireless device based mostly, or only, on the received signal quality of the potential reception point(s).

Once the network node has determined which reception point(s) are to be included in the CoMP reception, the network node determines the TBS based on both the available backhaul capacity and the determined signal quality for signals received by the reception point of the serving RBS and the cooperating reception point(s) of the respective further RBS(s).

In yet an example, when the available backhaul capacity is above a first threshold and below a second threshold, the method comprises adapting 135 the TBS such that the TBS is smaller compared to if the backhaul capacity would be above the second threshold and larger compared to if the backhaul capacity would be below the first backhaul threshold.

Very simplified, in some circumstances, it can be said that the more the backhaul capacity, the larger the possible TBS. However, there may be many other factors determining the TBS also based on what is to be achieved with the CoMP reception as will be explained in more detail below. When the available backhaul capacity is above the first threshold and below the second threshold, there is more limited capacity than when the available capacity is above the second threshold. Thus the network node is not free to determine the TBS freely, but must consider the impact the TBS will have on the backhaul capacity. Thus the network node adapts the TBS such that it is smaller compared to if the backhaul capacity would be above the second threshold and larger compared to if the backhaul capacity would be below the first backhaul threshold.

In this manner, the network node may perform the CoMP reception with the cooperating reception points with a TBS that probably may not cause overload on the backhaul and still improve resource utilisation and overall system performance.

In a further example, when the available backhaul capacity is equal to or below a first threshold, indicating that there is a limited amount of backhaul resources and/or that the TBS cannot be larger than the TBS based on the signal quality of transmission(s) from the wireless device received by the serving RBS, wherein if the backhaul capacity still allows for cooperation between RBSs, the method comprises selecting 132b a TBS to be smaller than or the same as the TBS based on the signal quality of transmission(s) from the wireless device received by the serving RBS and determining cooperating reception point(s) to be included in the CoMP reception of transmissions with the selected TBS based on both the determined available backhaul capacity and the received signal quality.

When the available backhaul capacity is equal to or below a first threshold, the backhaul is experiencing a relatively high load. Thus there is a limited amount of available backhaul resources. If CoMP reception is not used, then the TBS cannot be larger than the TBS based on the signal quality of transmission(s) from the wireless device received by the serving RBS. Since the available backhaul capacity is equal to or below a first threshold, there may still be some capacity left on the backhaul, especially if the available backhaul capacity is equal to or just below the first threshold.

However, it may still be desirable to reduce the air interface resource usage for the serving RBS even if the backhaul capacity is limited. The backhaul capacity may still allow for cooperation between RBSs, and thus the network node selecting 132b the TBS to be smaller than or the same as the TBS based on the signal quality of transmission(s) from the wireless device received by the serving RBS and determining cooperating reception point(s) to be included in the CoMP reception of transmissions with the selected TBS based on both the determined available backhaul capacity and the received signal quality. In this manner, the air interface resource usage for the serving RBS may be reduced, and the available backhaul resources may be effectively utilised.

In other words, the network node may use the same TBS but with less air interface resource usage (smaller allocation size) which may result in that air interface capacity may be used by other wireless devices. Another option is to use a smaller TBS than what may be achieved by receiving the transmission by only the reception point of the serving RBS, e.g. when the wireless device is in a really bad radio environment and coverage is significantly improved by adding the cooperating reception point for CoMP reception.

According to an embodiment, when the available backhaul capacity is equal to or below a first threshold, indicating that there is a limited amount of backhaul resources and/or that the TBS cannot be larger than the TBS based on the signal quality of transmission(s) from the wireless device received by the serving RBS, the method comprises instructing the cooperating reception point(s) to reduce the number of bits used for CoMP data exchange on the backhaul to the serving RBS.

In order to still be able to use a piece of the limited amount of backhaul capacity, the network node may try to limit the impact on the backhaul capacity caused by CoMP reception. By instructing the cooperating reception point(s) to reduce the number of bits used for CoMP data exchange on the backhaul to the serving RBS, the forwarding of the cooperating reception point's (or points') received transmission to the serving RBS will incur less load on the backhaul, by reducing the total number of bits of each transmission on the backhaul, thereby enabling CoMP reception by the serving RBS and the cooperating reception point(s).

In this manner, the total amount of data for each transmission on the backhaul may be reduced in order to reduce its load, thereby enabling CoMP reception by the serving RBS and the cooperating reception point(s).

According to still an embodiment, when the available backhaul capacity is equal to or below a first threshold, indicating that there is a limited amount of backhaul resources and/or that the TBS cannot be larger than the TBS based on the signal quality of transmission(s) from the wireless device received by the serving RBS, the method comprises instructing the RBS(s) of the cooperating reception point(s) to transmit decoded data, instead of encoded data, on the backhaul to the serving RBS.

This is another example of how to reduce the total amount of data transmitted on the backhaul. Since encoded data carries more overhead than decoded data, the RBS(s) of the cooperating reception point(s) may transmit decoded data to the serving RBS. Thus, the RBS(s) of the cooperating reception point(s) receives the transmission from the wireless device, decodes the received transmission and then transmits the decoded version of the received transmission to the serving RBS.

The serving RBS will also receive the transmission from the wireless device and will receive the decoded version(s) of the cooperating reception point(s) and may then process the transmission from the wireless device based on its own received version of the transmission and the, from the cooperating reception point(s), received decoded version(s) of the transmission.

The threshold(s) relating to available backhaul capacity may be dynamically set and based on at least one of a current load of the serving RBS, a current load of respective cooperating reception point(s).

The different threshold relating to backhaul load limit may be static or may be determined dynamically. The setting of the threshold may be determined by the network node or by e.g. an Operation and Administration and Maintenance, OAM, node. The thresholds may be set dynamically based on one or more characteristics, alone or in any combination. For example, the threshold(s) relating to available backhaul capacity may be determined by calculating generated backhaul load that using the calculated TBS would cause. So a first threshold may be the generated backhaul load using the TBS-result of serving cell only and a second threshold may be the load of using the TBS-result utilising the additional SINR gain obtained from CoMP reception. In other words, these thresholds are user specific depending on a range of scheduling parameters and estimated CoMP gain. Thresholds relating to backhaul load limit defining the amount of resources CoMP reception may utilise, may be set via an OAM node, which may be static or dynamically determined by using a number of capacity limitations and the current load situation (from S1 traffic and other CoMP traffic).

For example, the threshold may be dynamically set based on e.g. current load of the serving RBS or an interference situation of the serving RBS. In case the current load of the serving RBS is high, likely to result in an unfavourable interference situation, the need for CoMP reception may be much stronger than for an opposite situation. If so, then the thresholds may be set lower than if the load of the serving RBS is low and the interference situation is advantageous.

In an example, the network node is the serving RBS, the method further comprising receiving a transmission from the wireless device, receiving versions of the same transmission from cooperating reception points, and combining the received transmission with the received versions of the same transmission to one received transmission.

As briefly described above, the serving RBS will receive the transmission from the wireless device. Also the cooperating reception point(s) will receive the transmission from the wireless device. The cooperating reception point(s) will forward its/their version of the received transmission to the serving RBS. Thus the RBS will have its own version of the transmission as it was received by the serving RBS, and the version(s) of the transmission as received by the cooperating reception point(s). The RBS then process the different versions, e.g. by combining them, to deduce one received transmission.

Figure 2A:
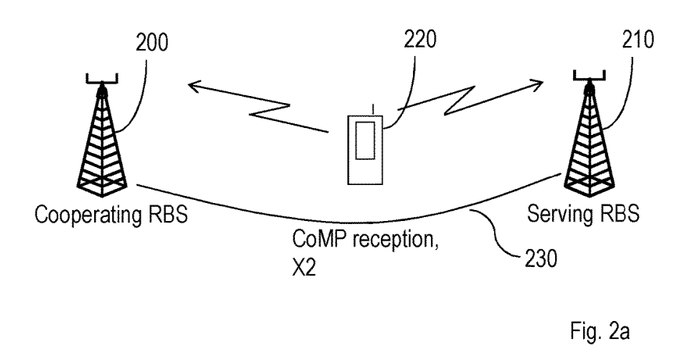
FIG. 2a is an illustration of a serving RBS, a wireless device and a cooperating RBS.

FIG. 2a is an illustration of a serving RBS 210, a wireless device 220 and a cooperating RBS 200. The wireless device 220 is connected to the serving RBS 210 by a reception point thereof and the serving RBS 210 also comprises the digital unit (not shown) that handles its reception point and may be responsible to perform the combined signal processing, or parts of it, for the CoMP reception of data arriving from cooperating reception points. Scheduling decisions for the wireless device 220 and cooperating reception point selection may also take place in the serving RBS 210 handling the serving reception point, or in an RNC controlling the serving RBS 210. Measurements are collected in order to make a proper evaluation about the potential gain in case of adding a reception point to the set of reception points used for CoMP reception. The reception points that are to be evaluated could in practice be any reception points in the network. However, a so-called "search set" (i.e. a set of potential cooperating reception points) is usually limited to only a few candidates, e.g. to all defined neighbouring RBSs or to reception points of RBSs that supports the CoMP scheme. This could be an operator configured set of reception points or a set automatically configured e.g. by Self Optimising Network, SON, based functionality.

The measurements that are to be collected from the set of potential cooperating reception points may help the network node to evaluate the potential gain that may be achieved in e.g. throughput, coverage or reduced air interface resource usage. One realisation example of this gain is referred to as the Signal-to-Interference and Noise Ratio, SINR, gain. When the candidate reception point belongs to another RBS, e.g. 200 in FIG. 2, than the RBS 210 of the serving reception point, information about the available capacity of the backhaul 230 should be available. This capacity, or limitation, could be a fixed configurable limit or an adaptive limit that may be based on measurements of the current backhaul load situation and other limiting factors. The reception point evaluation and scheduling for the wireless device 220 may take place once these measurements are available. One example of this procedure is the following:

1) One or several reception point(s) that belongs to a different RBS than the serving reception point has been identified to give a SINR gain for the wireless device 220. This wireless device 220 is about to go into a scheduling evaluation that eventually will determine a number of transmission parameters such as the TBS.

2) The network node evaluates the maximum TBS based on the estimated SINR in serving reception point only and the maximum TBS size that can be achieved by cooperation with the identified RBSs.

Figure 2B:
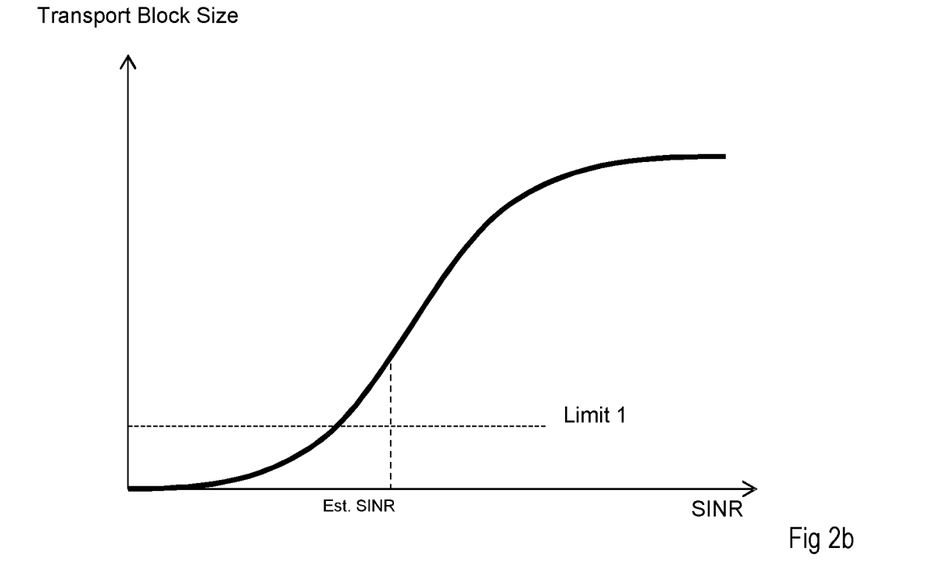
FIG. 2b is an illustration of TBS as a function of Signal to Interference and Noise Ratio, SINR, when the available backhaul capacity is limiting cooperation between RBSs.
Figure 2C:
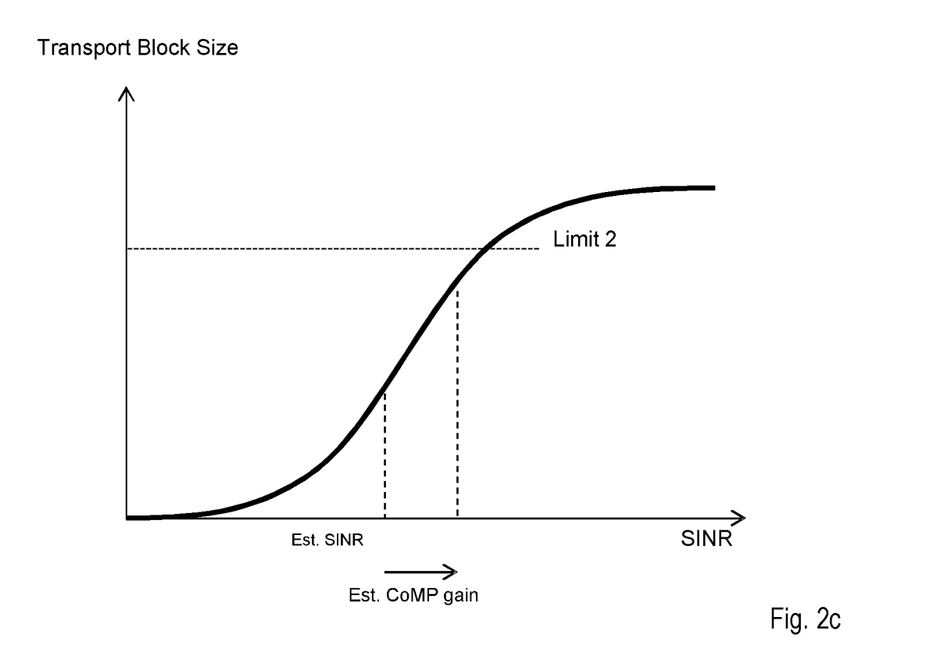
FIG. 2c is an illustration of TBS as a function of SINR when the available backhaul capacity allows cooperation between RBSs.
Figure 2D:
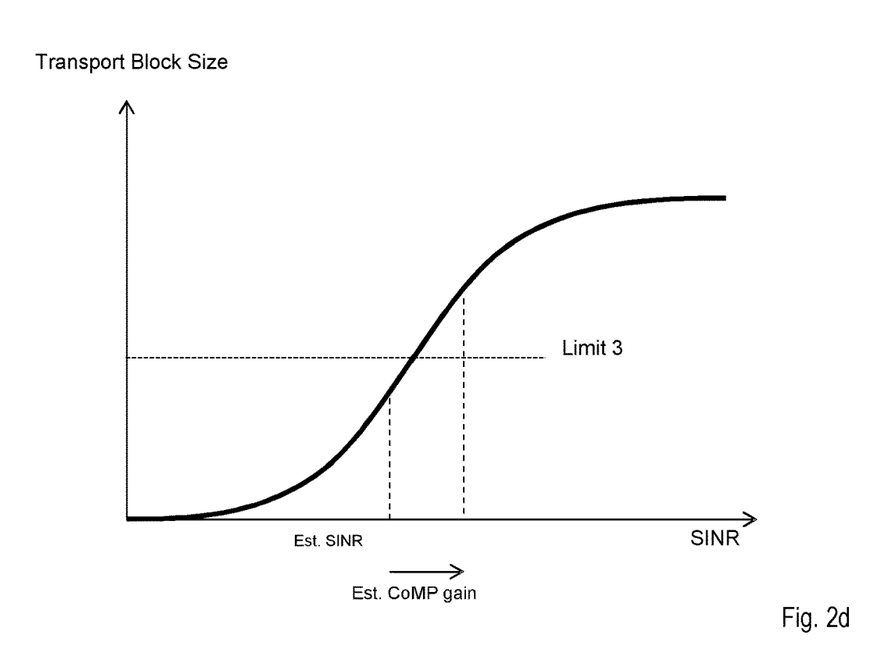
FIG. 2d is an illustration of TBS as a function of SINR when the available backhaul capacity allows for cooperation between RBSs at an adapted TBS size that utilises available backhaul capacity.

3) A scheduler in the network node is aware of the available backhaul capacity, or backhaul limitation, from the respective RBSs in question. This available capacity, or limitation, could be imposed by a number of different mechanisms. Examples of limitations could be the transport capacity of the transport network connecting the RBSs, the capacity of the serving or cooperating RBS or other already scheduled wireless devices utilising the available resources. In FIG. 2b, the backhaul is limiting the scheduler, Limit 1, to select the potential cooperating RBSs since the TBS would generate a load on the backhaul that exceeds a current available capacity, or limitation. In this case it would be better to use only the serving reception point or continue searching for other cooperation candidates. In FIG. 2c, the scheduler concludes that a larger TBS may be achieved by cooperating with another RBS. The backhaul also allows this cooperation to take place since the current available backhaul capacity, or limitation, Limit 2, is well above the additional load generated by this cooperation request. In FIG. 2d, the scheduler concludes that it is not possible to increase the TBS in accordance with the estimated SINR gain that cooperation between RBSs would give. However, since the backhaul load limit, Limit 3, (corresponding to available capacity, allows for cooperation at a reduced TBS but still larger compared to only using the serving reception point 210, the scheduler adapts the TBS so that the CoMP reception does not overload the backhaul 230 once it should be transferred. The scheduler's capability to dynamically adapt to the available backhaul capacity in these types of situations allows for a more efficient usage of spare transport capacity.

4) The available backhaul capacity, or backhaul limitation, is updated so that the next wireless device that is about to be scheduled may be evaluated properly.

5) The wireless device 220 receives the grant to transmit (issued by the scheduler of the serving RBS 210) and, if successfully selected, cooperating reception point of RBS 200 will receive the transmission from the wireless device 220. The serving reception point 210 will then receive the CoMP reception and make the final assembly of the transport block.

Note that the cooperation between reception points is not limited to only include one cooperating reception point. The reception point selection during scheduling may evaluate all candidates and reception points may be added to the set of cooperating reception points when they are contributing to the performance and removed from the set when they become obsolete or other limitations are imposed.

In another example, the scheduler identifies that it is not possible to increase the TBS size e.g. due to some backhaul limitations such a low available backhaul capacity. However, the scheduler identifies that the same TBS size may be achieved with a smaller allocation size if cooperation between two or several reception points is initiated. If the current backhaul load limit will allow for this cooperation to take place, the reduced allocation size for this particular scheduled wireless device may free up resources that may be utilised by another wireless device in the cell. This example would allow the scheduler to trade scarce air interface resources for additional backhaul load when available.

Embodiments herein also relate to a network node adapted for performing CoMP reception of a transmission from a wireless device being served by a serving RBS. The network node has the same technical features, advantages and objects as the method performed by the network node. The network node will thus be described in brief, with reference to FIGS. 2 and 3, in order to avoid unnecessary repetition.

Figure 3:
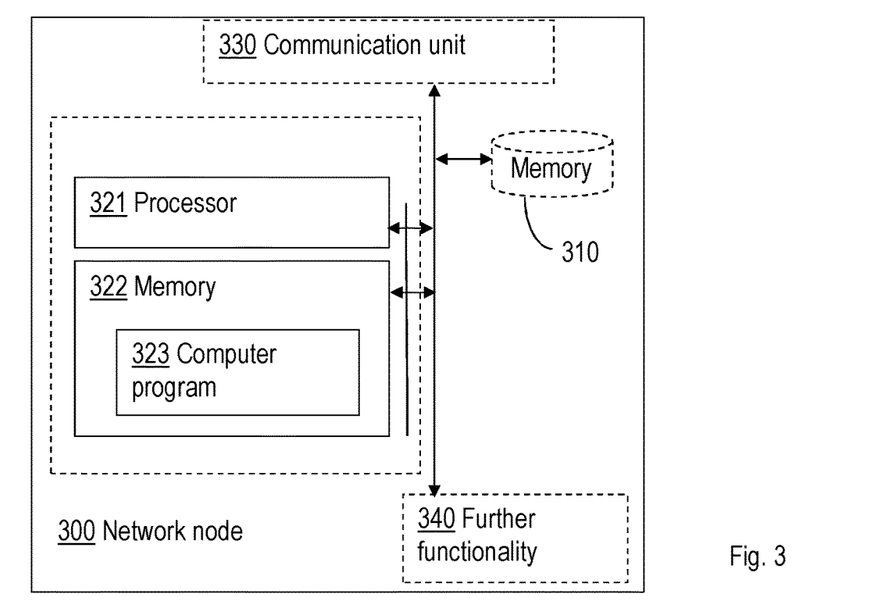
FIG. 3 is a block diagram of a network node adapted for performing CoMP reception of a transmission from a wireless device being served by a serving RBS according to an exemplifying embodiment.
Figure 4:
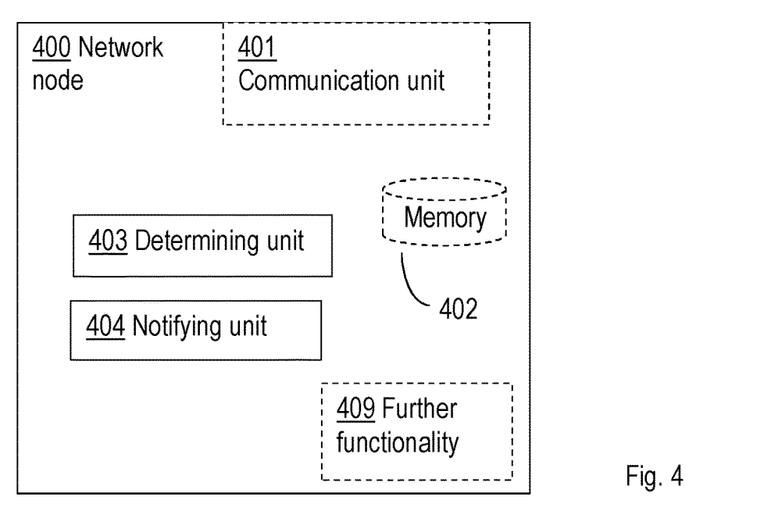
FIG. 4 is a block diagram of a network node for performing CoMP reception of a transmission from a wireless device being served by a serving RBS according to an exemplifying embodiment.

FIG. 3 and FIG. 4 illustrate the network node (300, 400) being configured to: determine an available backhaul capacity of a reception point of the serving RBS and of at least one potential reception point of respective further RBS(s); and to determine a received signal quality of a received signal, transmitted from the wireless device, received by the reception point of the serving RBS and received by the at least one potential reception point of the respective further RBS(s). The network node 300, 400 further is configured to determine cooperating reception point(s), from amongst the at least one potential reception point of the respective further RBS(s), to be included in the CoMP reception of the transmission from the wireless device and determining a TBS for the transmission from the wireless device based on the determined available backhaul capacity and received signal quality; and to notify the respective RBS(s) of the determined cooperation reception point(s) about their participation in the CoMP reception.

The network node 300, 400 may be implemented or realised in different ways. An exemplifying implementation is illustrated in FIG. 3. FIG. 3 illustrates the network node 300 comprising a processor 321 and memory 322, the memory comprising instructions, e.g. by means of a computer program 323, which when executed by the processor 321 causes the network node 300 to determine an available backhaul capacity of a reception point of the serving RBS and of at least one potential reception point of respective further RBS(s); and to determine a received signal quality of a received signal, transmitted from the wireless device, received by the reception point of the serving RBS and received by the at least one potential reception point of the respective further RBS(s). The instructions, when executed by the processor 321 may further cause the network node 300 to determine cooperating reception point(s), from amongst the at least one potential reception point of the respective further RBS(s), to be included in the CoMP reception of the transmission from the wireless device and determining a TBS for the transmission from the wireless device based on the determined available backhaul capacity and received signal quality; and to notify the respective RBS(s) of the determined cooperation reception point(s) about their participation in the CoMP reception.

An alternative exemplifying implementation of the network node is illustrated in FIG. 4. FIG. 4 illustrates the network node 400 comprising a determining unit 403 for determining an available backhaul capacity of a reception point of the serving RBS and of at least one potential reception point of respective further RBS(s); for determining a received signal quality of a received signal, transmitted from the wireless device, received by the reception point of the serving RBS and received by the at least one potential reception point of the respective further RBS(s), and for determining cooperating reception point(s), from amongst the at least one potential reception point of the respective further RBS(s), to be included in the CoMP reception of the transmission from the wireless device and determining a TBS for the transmission from the wireless device based on the determined available backhaul capacity and received signal quality. FIG. 4 also illustrates the network node 400 comprising a notifying unit 404 for notifying the respective RBS(s) of the determined cooperation reception point(s) about their participation in the CoMP reception.

The network node has the same possible advantages as the method performed by the network node. One possible advantage is that the available radio and transport resources may be efficiently utilised to maximise overall system performance. Another possible advantage is that possible overload of the interfaces, e.g. the backhaul, may be avoided and thus potential disruption of other more important traffic may be avoided. Still a possible advantage is that it may ensure that cooperation requests may be successful thus endorsing expected performance improvement. Yet a possible advantage is that data may not be lost due to congestion since the CoMP reception may not be performed in case the backhaul is congested.

According to an embodiment, the network node 300, 400 further is configured to determine a respective load situation of the respective RBS of the potential reception point(s), wherein the network node 300, 400 further is configured to determine cooperating reception point(s) to be included in the CoMP reception of transmissions from the wireless device further is based on the determined load situation of the respective RBS(s) of the potential reception point(s).

According to yet an embodiment, when the available backhaul capacity is below a first threshold, the network node 300, 400 is configured to refrain from cooperating with any other reception point of any other respective RBS, from amongst the at least one potential reception point of the respective further RBS(s), and to determine the TBS based on the signal quality of received transmission(s) from the wireless device received by the serving RBS.

According to still an embodiment, when the available backhaul capacity is above a second threshold, the network node 300, 400 further is configured to determine the TBS based on both the available backhaul capacity and the determined signal quality for signals received by the reception point of the serving RBS and the cooperating reception point(s) of the respective further RBS(s).

According to another embodiment, when the available backhaul capacity is above a first threshold and below a second threshold, the network node 300, 400 further is configured to adapt the TBS such that the TBS is smaller compared to if the backhaul capacity would be above the second threshold and larger compared to if the backhaul capacity would be below the first backhaul threshold.

According to a further embodiment, when the available backhaul capacity is equal to or below a first threshold, indicating that there is a limited amount of backhaul resources and/or that the TBS cannot be larger than the TBS based on the signal quality of transmission(s) from the wireless device received by the serving RBS, wherein if the backhaul capacity still allows for cooperation between RBSs, the network node 300, 400 further is configured to select a TBS to be smaller than or the same as the TBS based on the signal quality of transmission(s) from the wireless device received by the serving RBS and to determine cooperating reception point(s) to be included in the CoMP reception of transmissions with the selected TBS based on both the determined available backhaul capacity and the received signal quality.

According to yet an embodiment, when the available backhaul capacity is equal to or below a first threshold, indicating that there is a limited amount of backhaul resources and/or that the TBS cannot be larger than the TBS based on the signal quality of transmission(s) from the wireless device received by the serving RBS, the network node 300, 400 is configured for instructing the cooperating reception point(s) to reduce a number of bits used for CoMP data exchange on the backhaul to the serving RBS.

According to yet a further embodiment, when the available backhaul capacity is equal to or below a first threshold, indicating that there is a limited amount of backhaul resources and/or that the TBS cannot be larger than the TBS based on the signal quality of transmission(s) from the wireless device received by the serving RBS, the network node 300, 400 is configured to instruct the RBS(s) of the cooperating reception point(s) to transmit decoded data, instead of encoded data, on the backhaul to the serving RBS.

The thresholds may be dynamically set and based on at least one of a current load of the serving RBS, a current load of respective cooperating reception point(s).

According to another embodiment, the network node is the serving RBS, the network node 300, 400 further being configured to receive a transmission from the wireless device, to receive versions of the same transmission from cooperating reception points, and to combine the received transmission with the received versions of the same transmission to one received transmission.

In FIG. 4, the network node 400 is also illustrated comprising a communication unit 401. Through this unit, the network node 400 is adapted to communicate with other nodes and/or entities in the wireless communication network. The communication unit 401 may comprise more than one receiving arrangement. For example, the communication unit 401 may be connected to both a wire and an antenna, by means of which the network node 400 is enabled to communicate with other nodes and/or entities in the wireless communication network. Similarly, the communication unit 401 may comprise more than one transmitting arrangement, which in turn may be connected to both a wire and an antenna, by means of which the network node 400 is enabled to communicate with other nodes and/or entities in the wireless communication network. The network node 400 further comprises a memory 402 for storing data. Further, the network node 400 may comprise a control or processing unit (not shown) which in turn is connected to the different units 403-404. It shall be pointed out that this is merely an illustrative example and the network node 400 may comprise more, less or other units or modules which execute the functions of the network node 400 in the same manner as the units illustrated in FIG. 4.

It should be noted that FIG. 4 merely illustrates various functional units in the network node 400 in a logical sense. The functions in practice may be implemented using any suitable software and hardware means/circuits etc. Thus, the embodiments are generally not limited to the shown structures of the network node 400 and the functional units. Hence, the previously described exemplary embodiments may be realised in many ways. For example, one embodiment includes a computer-readable medium having instructions stored thereon that are executable by the control or processing unit for executing the method steps in the network node 400. The instructions executable by the computing system and stored on the computer-readable medium perform the method steps of the network node 400 as set forth in the claims.

Figure 5:
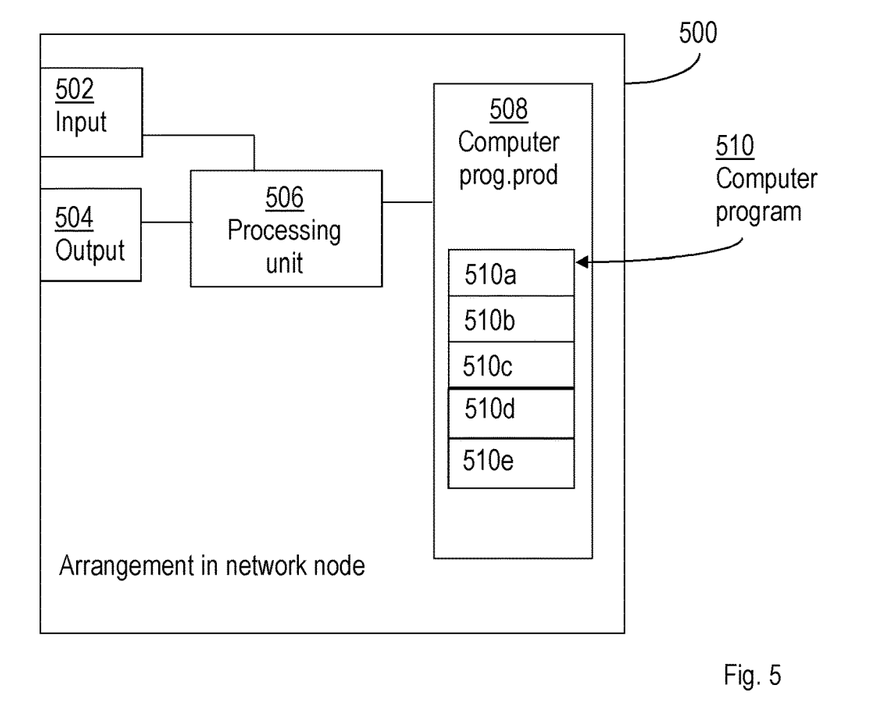
FIG. 5 is a block diagram of an arrangement in a network node adapted for performing CoMP reception of a transmission from a wireless device being served by a serving RBS according to an exemplifying embodiment.

FIG. 5 schematically shows an embodiment of an arrangement 500 in a network node. Comprised in the arrangement 500 in the network node are here a processing unit 506, e.g. with a Digital Signal Processor, DSP. The processing unit 506 may be a single unit or a plurality of units to perform different actions of procedures described herein. The network node may also comprise an input unit 502 for receiving signals from other entities, and an output unit 504 for providing signal(s) to other entities. The input unit and the output unit may be arranged as an integrated entity or as illustrated in the example of FIG. 4, as one or more interfaces 401.

Furthermore, the arrangement in the network node comprises at least one computer program product 508 in the form of a non-volatile memory, e.g. an Electrically Erasable Programmable Read-Only Memory, EEPROM, a flash memory and a hard drive. The computer program product 508 comprises a computer program 510, which comprises code means, which when executed in the processing unit 506 in the arrangement in the network node causes the network node to perform the actions e.g. of the procedure described earlier in conjunction with FIGS. 1a-1e.

The computer program 510 may be configured as a computer program code structured in computer program modules 510a-510e. Hence, in an exemplifying embodiment, the code means in the computer program of the network node comprises a determining unit, or module, for determining for determining an available backhaul capacity of a reception point of the serving RBS and of at least one potential reception point of respective further RBS(s); for determining a received signal quality of a received signal, transmitted from the wireless device, received by the reception point of the serving RBS and received by the at least one potential reception point of the respective further RBS(s), and for determining cooperating reception point(s), from amongst the at least one potential reception point of the respective further RBS(s), to be included in the CoMP reception of the transmission from the wireless device and determining a TBS for the transmission from the wireless device based on the determined available backhaul capacity and received signal quality. The computer program further comprises a notifying unit, or module, for notifying the respective RBS(s) of the determined cooperation reception point(s) about their participation in the CoMP reception.

The computer program modules could essentially perform the actions of the flow illustrated in FIG. 1a, to emulate the network node 400. In other words, when the different computer program modules are executed in the processing unit 506, they may correspond to the units 403-404 of FIG. 4.

Although the code means in the embodiments disclosed above in conjunction with FIG. 4 are implemented as computer program modules which when executed in the processing unit causes the network node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method, performed by a network node in a wireless communication network, for performing Coordinated Multi Point (CoMP) reception of a transmission from a wireless device being served by a serving Radio Base Station (RBS), the method comprising:
   determining an available backhaul capacity of a reception point of the serving RBS and of at least one potential reception point of respective further RBS(s);
   determining a received signal quality of a received signal, transmitted from the wireless device, received by the reception point of the serving RBS and received by the at least one potential reception point of the respective further RBS(s);
   both determining cooperating reception point(s), from amongst the at least one potential reception point of the respective further RBS(s), to be included in the CoMP reception of the transmission from the wireless device and determining a Transport Block Size (TBS) for the transmission from the wireless device based on the determined available backhaul capacity and received signal quality; and
   notifying the respective RBS(s) of the determined cooperating reception point(s)' participation in the CoMP reception.

2. The method of claim 1:
   further comprising determining a respective load situation of the respective RBS of the potential reception point(s);
   wherein the determining cooperating reception point(s) to be included in the CoMP reception of transmissions from the wireless device further is based on the determined load situation of the respective RBS(s) of the potential reception point(s).

3. The method of claim 1, wherein, when the available backhaul capacity is below a first threshold, the method comprises:
   refraining from cooperating with any other reception point of any other respective RBS, from amongst the at least one potential reception point of the respective further RBS(s); and
   determining the TBS based on the signal quality of received transmission(s) from the wireless device received by the serving RBS.

4. The method of claim 1, wherein, when the available backhaul capacity is above a second threshold, the method comprises determining the TBS based on both the available backhaul capacity and the determined signal quality for signals received by the reception point of the serving RBS and the cooperating reception point(s) of the respective further RBS(s).

5. The method claim 1, wherein, when the available backhaul capacity is above a first threshold and below a second threshold, the method comprises adapting the TBS such that the TBS is smaller compared to if the backhaul capacity would be above the second threshold and larger compared to if the backhaul capacity would be below the first backhaul threshold.

6. The method if claim 1, wherein, when the available backhaul capacity is equal to or below a first threshold and if the backhaul capacity still allows for cooperation between RBSs, the method comprises:
   selecting a TBS to be smaller than or the same as the TBS based on the signal quality of transmission(s) from the wireless device received by the serving RBS; and
   determining cooperating reception point(s) to be included in the CoMP reception of transmissions with the selected TBS based on both the determined available backhaul capacity and the received signal quality.

7. The method of claim 1, wherein, when the available backhaul capacity is equal to or below a first threshold, the method comprises instructing the cooperating reception point(s) to reduce a number of bits used for CoMP data exchange on backhaul to the serving RBS.

8. The method of claim 1, wherein, when the available backhaul capacity is equal to or below a first threshold, the method comprises instructing the RBS(s) of the cooperating reception point(s) to transmit decoded data, instead of encoded data, on backhaul to the serving RBS.

9. The method of claim 3, wherein the first threshold is dynamically set and based on one or both of: a current load of the serving RBS and a current load of respective cooperating reception point(s).

10. The method of claim 1:
    wherein the network node is the serving RBS;
    the method further comprising receiving a transmission from the wireless device;
    receiving versions of a same transmission from cooperating reception points;
    combining the received transmission with the received versions of the same transmission to one received transmission.

11. A network node in a wireless communication network for performing Coordinated Multi Point (CoMP) reception of a transmission from a wireless device being served by a serving Radio Base Station (RBS), the network node comprising:

processing circuitry;
memory comprising instructions executable by the processing circuitry whereby the network node is operable to:
    determine an available backhaul capacity of a reception point of the serving RBS and of at least one potential reception point of respective further RBS(s);
    determine a received signal quality of a received signal, transmitted from the wireless device, received by the reception point of the serving RBS and received by the at least one potential reception point of the respective further RBS(s);
    determine cooperating reception point(s), from amongst the at least one potential reception point of the respective further RBS(s), to be included in the CoMP reception of the transmission from the wireless device and determining a Transport Block Size (TBS) for the transmission from the wireless device based on the determined available backhaul capacity and received signal quality; and
    notify the respective RBS(s) of the determined cooperating reception point(s)' participation in the CoMP reception.

12. The network node of claim 11, wherein the instructions are such that the network node is further operative to:
    determine a respective load situation of the respective RBS of the potential reception point(s);
    determine cooperating reception point(s) to be included in the CoMP reception of transmissions from the wireless device based on the determined load situation of the respective RBS(s) of the potential reception point(s).

13. The network node of claim 11, wherein the instructions are such that the network node is further operative to, when the available backhaul capacity is below a first threshold:
    refrain from cooperating with any other reception point of any other respective RBS, from amongst the at least one potential reception point of the respective further RBS(s);
    determine the TBS based on the signal quality of received transmission(s) from the wireless device received by the serving RBS.

14. The network node of claim 11, wherein the instructions are such that the network node is further operative to, when the available backhaul capacity is above a second threshold, determine the TBS based on both the available backhaul capacity and the determined signal quality for signals received by the reception point of the serving RBS and the cooperating reception point(s) of the respective further RBS(s).

15. The network node of claim 11, wherein the instructions are such that the network node is further operative to, when the available backhaul capacity is above a first threshold and below a second threshold, adapt the TBS such that the TBS is smaller compared to if the backhaul capacity would be above the second threshold and larger compared to if the backhaul capacity would be below the first backhaul threshold.

16. The network node of claim 11, wherein the instructions are such that the network node is further operative to, when the available backhaul capacity is equal to or below a first threshold and the backhaul capacity still allows for cooperation between RBSs:
    select a TBS to be smaller than or the same as the TBS based on the signal quality of transmission(s) from the wireless device received by the serving RBS; and
    determine cooperating reception point(s) to be included in the CoMP reception of transmissions with the selected TBS based on both the determined available backhaul capacity and the received signal quality.

17. The network node of claim 11, wherein the instructions are such that the network node is further operative to, when the available backhaul capacity is equal to or below a first threshold, instruct the cooperating reception point(s) as to a number of bits used for CoMP data exchange on backhaul to the serving RBS.

18. The network node of claim 11, wherein the instructions are such that the network node is further operative to, when the available backhaul capacity is equal to or below a first threshold, instruct the RBS(s) of the cooperating reception point(s) to transmit decoded data, instead of encoded data, on backhaul to the serving RBS.

19. The network node of claim 13, wherein the first threshold is dynamically set and based on one or both of: a current load of the serving RBS and a current load of respective cooperating reception point(s).

20. The network node of claim 11:
    wherein the network node is the serving RBS;
    wherein the instructions are such that the network node is further operative to:
        receive a transmission from the wireless device;
        receive versions of a same transmission from cooperating reception points; and
        combine the received transmission with the received versions of the same transmission to one received transmission.

21. A non-transitory computer readable medium storing a computer program for performing Coordinated Multi Point (CoMP) reception of a transmission from a wireless device being served by a serving Radio Base Station (RBS), the computer program comprising executable software instructions that, when run on processing circuitry of a network node, causes the network node to:
    determine an available backhaul capacity of a reception point of the serving RBS and of at least one potential reception point of respective further RBS(s);
    determine a received signal quality of a received signal, transmitted from the wireless device, received by the reception point of the serving RBS and received by the at least one potential reception point of the respective further RBS(s);
    both determine cooperating reception point(s), from amongst the at least one potential reception point of the respective further RBS(s), to be included in the CoMP reception of the transmission from the wireless device, and determine a Transport Block Size (TBS) for the transmission from the wireless device based on the determined available backhaul capacity and received signal quality; and
    notify the respective RBS(s) of the determined cooperating reception point(s)' participation in the CoMP reception.

* * * * *

UNITED STATES PATENT AND TRADEMARK OFFICE
CERTIFICATE OF CORRECTION

PATENT NO. : 10,211,888 B2
APPLICATION NO. : 15/308120
DATED : February 19, 2019
INVENTOR(S) : Christensson et al.

It is certified that error appears in the above-identified patent and that said Letters Patent is hereby corrected as shown below:

On the Title Page

In item (57), under "ABSTRACT", in Column 2, Line 11, delete "reception of" and insert -- reception point(s), to be included in the CoMP reception of --, therefor.

In the Claims

In Column 16, Line 21, in Claim 5, delete "method claim" and insert -- method of claim --, therefor.

In Column 16, Line 28, in Claim 6, delete "method if claim" and insert -- method of claim --, therefor.

Signed and Sealed this
Eighth Day of October, 2019

Andrei Iancu
*Director of the United States Patent and Trademark Office*